United States Patent
Sai

(10) Patent No.: US 12,520,284 B2
(45) Date of Patent: Jan. 6, 2026

(54) BASE STATION APPARATUS, COMPUTER-READABLE STORAGE MEDIUM, SYSTEM, AND CONTROL METHOD

(71) Applicant: SOFTBANK CORP., Tokyo (JP)

(72) Inventor: Jutatsu Sai, Kanagawa (JP)

(73) Assignee: SoftBank Corp., Tokyo (JP)

( * ) Notice: Subject to any disclaimer, the term of this patent is extended or adjusted under 35 U.S.C. 154(b) by 329 days.

(21) Appl. No.: 18/337,435

(22) Filed: Jun. 20, 2023

(65) Prior Publication Data

US 2023/0337195 A1 Oct. 19, 2023

Related U.S. Application Data

(63) Continuation of application No. PCT/JP2021/046363, filed on Dec. 15, 2021.

(30) Foreign Application Priority Data

Dec. 25, 2020 (JP) ................................. 2020-217613

(51) Int. Cl.
*H04W 72/044* (2023.01)
*H04W 64/00* (2009.01)
(Continued)

(52) U.S. Cl.
CPC ......... *H04W 72/044* (2013.01); *H04W 64/00* (2013.01); *H04W 72/541* (2023.01); *H04W 84/06* (2013.01); *H04W 88/08* (2013.01)

(58) Field of Classification Search
CPC . H04W 72/044; H04W 64/00; H04W 72/541; H04W 84/06; H04W 88/08; H04W 16/10; H04W 84/005; H04B 7/18504
See application file for complete search history.

(56) References Cited

U.S. PATENT DOCUMENTS

2010/0322183 A1 12/2010 Iwamatsu
2012/0069814 A1 3/2012 Konishi
(Continued)

FOREIGN PATENT DOCUMENTS

JP 2011004100 A 1/2011
JP 2019213078 A 12/2019
(Continued)

OTHER PUBLICATIONS

International Search Report and Written Opinion (ISA/237) of the International Search Authority for International Patent Application No. PCT/JP2021/046363, mailed by the Japan Patent Office on Mar. 22, 2022.
(Continued)

*Primary Examiner* — Abdullahi Ahmed

(57) ABSTRACT

Provided is a base station apparatus mounted on a flight vehicle and forming a multi-cell comprising cells on the ground to provide a wireless communication service for a user terminal within the multi-cell, comprising: a location-information acquiring unit that acquires location information of a user terminal served by the multi-cell; a flight-vehicle-related information acquiring unit that acquires flight-vehicle-related information comprising location information and attitude information of the flight vehicle; a terminal identification unit that identifies, among the user terminals, a victim user terminal expected to receive interference from a cell other than a cell serving, based on the location information of the user terminals and the flight-vehicle-related information; and a scheduling control unit that controls, to prevent the interference, scheduling of wireless resources of a first cell being the cell serving the victim user terminal, and a second cell being the cell expected to interfere with the victim user terminal.

15 Claims, 6 Drawing Sheets

(51) Int. Cl.
*H04W 72/541* (2023.01)
*H04W 84/06* (2009.01)
*H04W 88/08* (2009.01)

(56) References Cited

U.S. PATENT DOCUMENTS

| | | | | |
|---|---|---|---|---|
| 2017/0324463 | A1* | 11/2017 | Jalali | H04B 7/18502 |
| 2021/0203408 | A1* | 7/2021 | Hirai | H04B 7/18534 |
| 2022/0014259 | A1* | 1/2022 | Sai | H04W 84/06 |
| 2022/0022119 | A1 | 1/2022 | Sai | |
| 2023/0318697 | A1* | 10/2023 | Sai | H04B 17/345 |
| 2023/0345330 | A1* | 10/2023 | Nozaki | H04W 36/0009 |
| 2025/0175861 | A1* | 5/2025 | Han | H04W 76/27 |

FOREIGN PATENT DOCUMENTS

| | | | |
|---|---|---|---|
| JP | 2020167450 | A | 10/2020 |
| JP | 2020170888 | A | 10/2020 |
| WO | 2010137313 | A1 | 12/2010 |
| WO | 2019215288 | A1 | 11/2019 |

OTHER PUBLICATIONS

Extended European Search Report for counterpart European Application No. 21910540.0, issued by the European Patent Office on Jun. 26, 2024.
Azade Fotouhi et al. Dynamic base station repositioning to improve spectral efficiency of drone small cells, https://doi.org/10.48550/arXiv.1704.01244, Apr. 5, 2017 arxiv.org, Cornell University Library,201OLIN Library Cornell University Ithaca, NY 14853.

* cited by examiner

BASE STATION APPARATUS, COMPUTER-READABLE STORAGE MEDIUM, SYSTEM, AND CONTROL METHOD

The contents of the following patent application(s) are incorporated herein by reference:
NO. 2020-217613 filed in JP on Dec. 25, 2020
NO. PCT/JP2021/046363 filed in WO on Dec. 15, 2021

TECHNICAL FIELD

The present invention relates to a base station apparatus, a computer-readable storage medium, a system, and a control method.

RELATED ART

Patent Document 1 describes a flight vehicle that forms a multi-cell on the ground by irradiating beams toward the ground to provide a wireless communication service for a user terminal within the multi-cell.

PRIOR ART DOCUMENT

Patent Literature

Patent Document 1: Japanese Patent Application Publication No. 2020-170888

DESCRIPTION OF EXEMPLARY EMBODIMENTS

A flight vehicle that forms a multi-cell on the ground while flying overhead is prone to have a wireless environment of a multi-cell configuration that easily changes depending on flight conditions (turning, ascending, and descending) and interference conditions with a user terminal (sometimes referred to as a UE (User Equipment)) that also easily change. Such a change in the wireless environment deteriorates interference conditions of wireless resources scheduled for a UE and reduces a throughput of the UE in some cases. A base station apparatus mounted on a flight vehicle, according to the present embodiment, constantly acquires, for example, flight-vehicle-related information (a latitude and longitude, an altitude, an inclination, and the like), and performs inter-cell coordinated control for respective cells of the multi-cell (scheduling is adjusted between the respective cells), thereby performing appropriate scheduling and improving the throughput of the UE.

Hereinafter, the present invention will be described through embodiments of the invention, but the following embodiments do not limit the invention according to claims. In addition, not all of the combinations of features described in the embodiments are essential to the solution of the invention.

Figure 1:
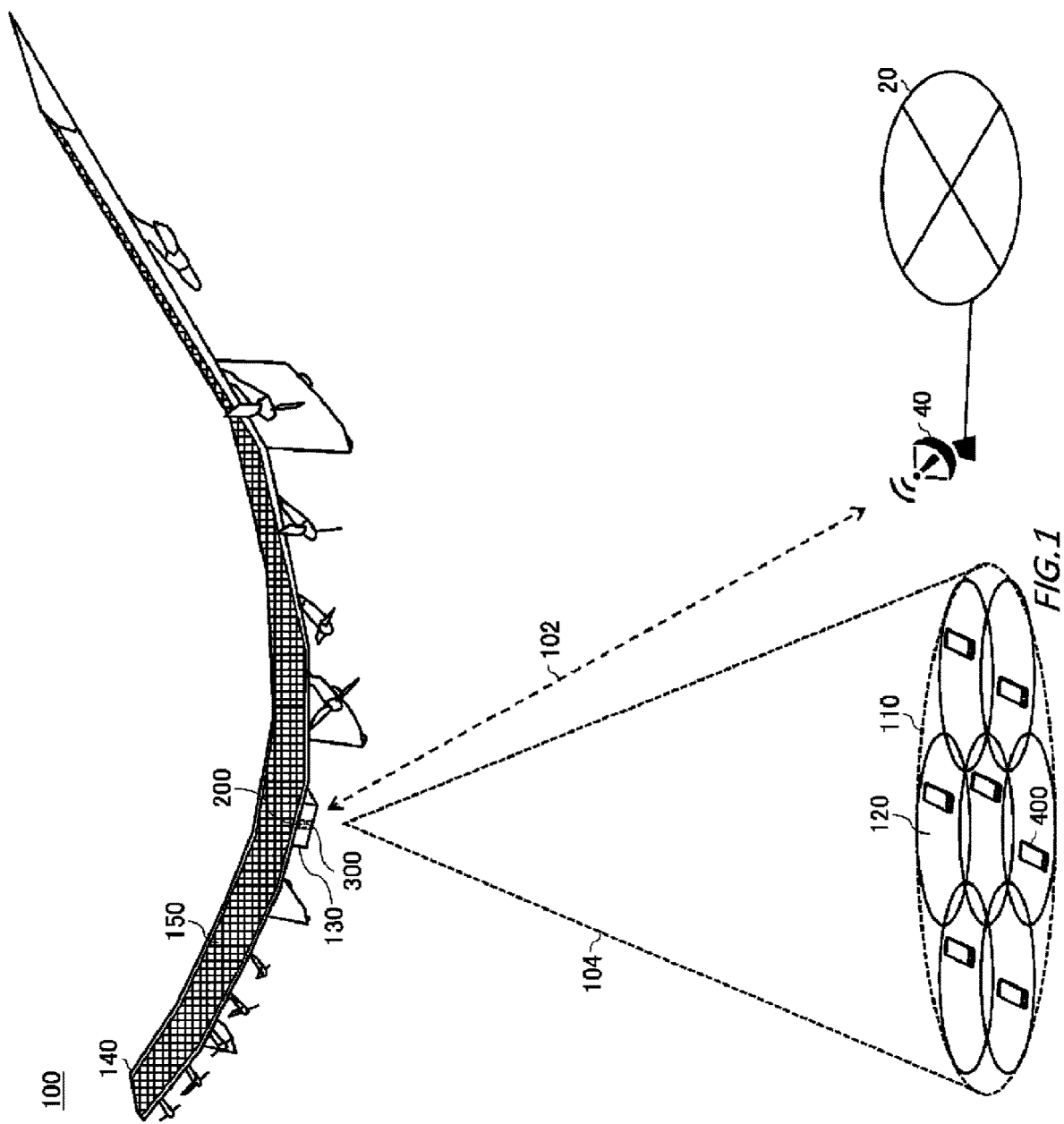
FIG. 1 schematically shows an example of a HAPS 100.

FIG. 1 schematically shows an example of a HAPS 100. The HAPS 100 may be an example of a flight vehicle. The HAPS 100 may function as a high-altitude platform station. The HAPS 100, for example, while flying in the stratosphere, forms a feeder link 102 with a gateway 40 on the ground and forms a multi-cell 110 by irradiating beams 104 toward the ground. The HAPS 100 provides a wireless communication service to user terminals 400 within the multi-cell 110.

The HAPS 100 includes a main body 130, a wing portion 140, and a solar cell panel 150. An electric power generated by the solar cell panel 150 is stored in one or more batteries arranged in at least either the main body 130 or the wing portion 140. The electric power stored in the battery is used by each component included by the HAPS 100.

The main body 130 has a flight control apparatus 200 and a base station apparatus 300 arranged therein. The flight control apparatus 200 controls a flight of the HAPS 100. The base station apparatus 300 controls communication of the HAPS 100. The HAPS 100 and the base station apparatus 300 may be included in a system.

The flight control apparatus 200 controls the flight of the HAPS 100 by, for example, controlling a propeller revolution, angles of a flap and an elevator, and the like. The flight control apparatus 200 may manage various sensors included by the HAPS 100. Examples of the sensors include a positioning sensor such as a GPS (Global Positioning System) sensor, a gyro sensor, an acceleration sensor, a wind power sensor, and the like. The flight control apparatus 200 may manage a location, an attitude, a movement direction, a movement speed, and the like of the HAPS 100 based on outputs of the various sensors.

The base station apparatus 300 may form the feeder link 102 with the gateway 40 using an FL (Feeder Link) antenna. The base station apparatus 300 may access a network 20 via the gateway 40.

The base station apparatus 300 may form the multi-cell 110 by irradiating the beams 104 toward the ground using an SL (Service Link) antenna. The multi-cell 110 is composed of a plurality of cells 120. Although FIG. 1 illustrates a case where a number of the cells 120 is seven, the number of the cells 120 is not limited to this. The base station apparatus 300 may establish service links with the user terminals 400 within the multi-cell 110.

The base station apparatus 300 relays communication between the network 20 and the user terminals 400 via, for example, the feeder link 102 and the service links. The base station apparatus 300 may provide a wireless communication service to the user terminals 400 by relaying the communication between the user terminals 400 and the network 20.

The network 20 may include a core network managed by a telecommunications carrier.

The core network may be compliant with the LTE (Long Term Evolution) communication method. In other words, the core network may be an EPC (Evolved Packet Core). The core network may be compliant with the 5G (5th Generation) communication method. In other words, the core network may be a 5GC (5th Generation Core network). The core network may be compliant with the 3G (3rd Generation) communication method, or may be compliant with a communication method of the 6G (6th Generation) communication method or later. The network 20 may include the Internet.

The user terminals 400 may be any communication terminal as long as it can communicate with the HAPS 100. For example, the user terminals 400 are mobile phones such as a smart phone. The user terminals 400 may be tablet terminals, PCs (Personal Computer), or the like. The user terminals 400 may be so-called IoT (Internet of Things) devices. The user terminals 400 can include anything that corresponds to a so-called IoE (Internet of Everything).

The HAPS 100 may orbit over a target area to cover the target area on the ground with the multi-cell 110. The HAPS 100, for example, while performing a round flight on a predetermined flight path such as in a circle, a D-shape, or a FIG. 8 shape over a target area, keeps the feeder link 102 with the gateway 40 by adjusting a pointing direction of the FL antenna, and keeps coverage with the multi-cell 110 over the target area by adjusting a pointing direction of the SL antenna. Such rounding over the target area in a determined orbit may be referred to as a fixed-point flight.

The HAPS 100 constantly changes its location and attitude due to flight. Also, the HAPS 100 may change the attitude finely or greatly due to wind effects and the like. Thus, a wireless environment of the multi-cell 110 easily changes depending on flight conditions of the HAPS 100. The HAPS 100 forms the multi-cell 110 with a plurality of beams, and all the cells 120 may move uniformly, or each of the plurality of cells 120 may move separately.

Figure 2:
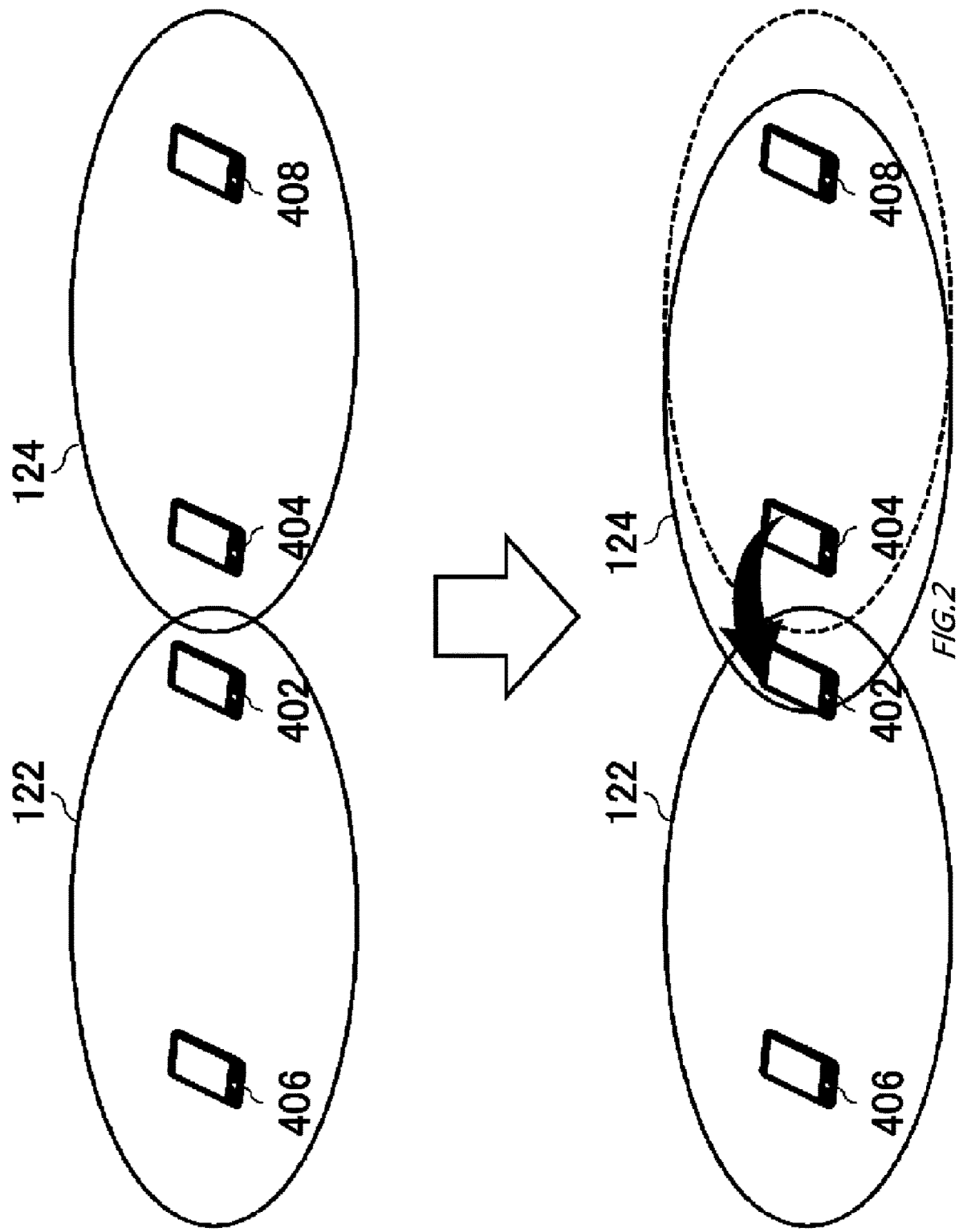
FIG. 2 illustrates interference caused by locational variation or the like of the HAPS 100.

FIG. 2 illustrates interference caused by locational variation or the like of the HAPS 100. Here, only two cells 122 and 124 of the multi-cell 110 are focused on, and, by way of an example, a case where a location of the cell 124 is displaced is described. In this example, a user terminal 402 and a user terminal 406 are served by the cell 122, and a user terminal 404 and a user terminal 408 are served by the cell 124.

Before the cell 124 is displaced, the user terminal 402 is located within the cell 122 and the user terminal 404 is located within the cell 124, but after the cell 124 is displaced, the user terminal 402 is located within both the cell 122 and the cell 124. In such a case, allocating a resource block, to the user terminal 404 located close to the user terminal 402, having a same frequency band and a same time slot as a resource block for the user terminal 402 in the cell 122 causes communication of the user terminal 404 to cause interference to the user terminal 402, resulting in reduced throughput.

Figure 3:
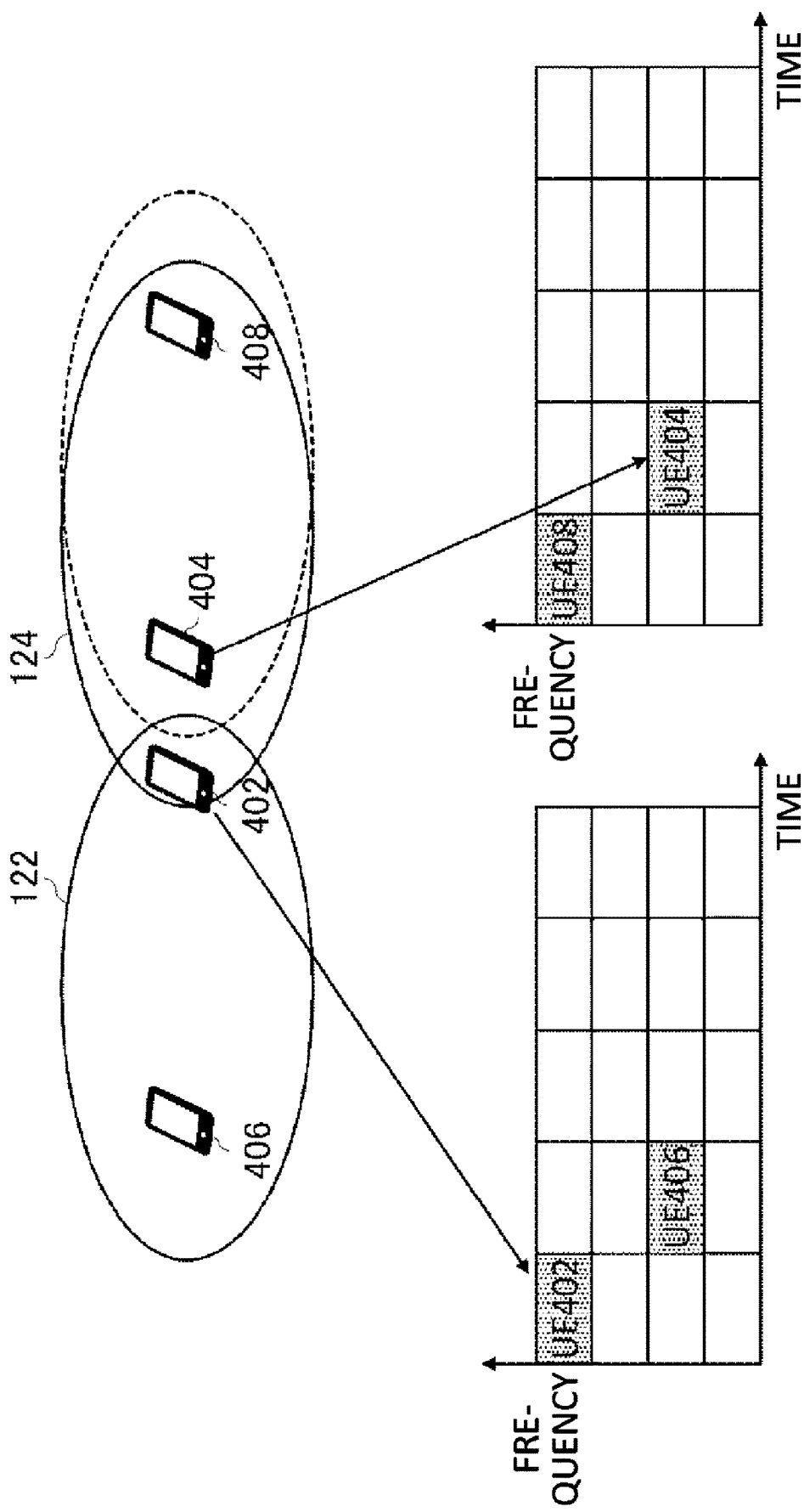
FIG. 3 illustrates control of scheduling of wireless resources by a base station apparatus 300.

FIG. 3 illustrates control of scheduling of wireless resources by the base station apparatus 300. The base station apparatus 300 controls the scheduling of the wireless resources to prevent the interference described in FIG. 2.

In an example shown in FIG. 3, the base station apparatus 300 allocates a resource block in the cell 124 corresponding to a resource block allocated to the user terminal 402 in the cell 122 to the user terminal 408 that is distant from and has a weak correlation to the user terminal 402. The resource block in the cell 124 corresponding to the resource block in the cell 122 may refer to a resource block in the cell 124 having a same frequency band and a same time slot as the resource block in the cell 122. A directivity provided by data communication between the base station apparatus 300 and the user terminal 408 does not cause allocating, to the user terminal 408, a resource block having a same frequency band and a same time slot as the user terminal 402 to interfere with the user terminal 402.

Then, the base station apparatus 300 allocates, to the user terminal 404 that is close to and has a strong correlation to the user terminal 402, a resource block in the cell 124 having both a different frequency band and a different time slot from a resource block allocated to the user terminal 402 in the cell 122. Thus, the communication by the user terminal 404 in the cell 124 can be prevented from interfering with communication of the user terminal 402.

Figure 4:
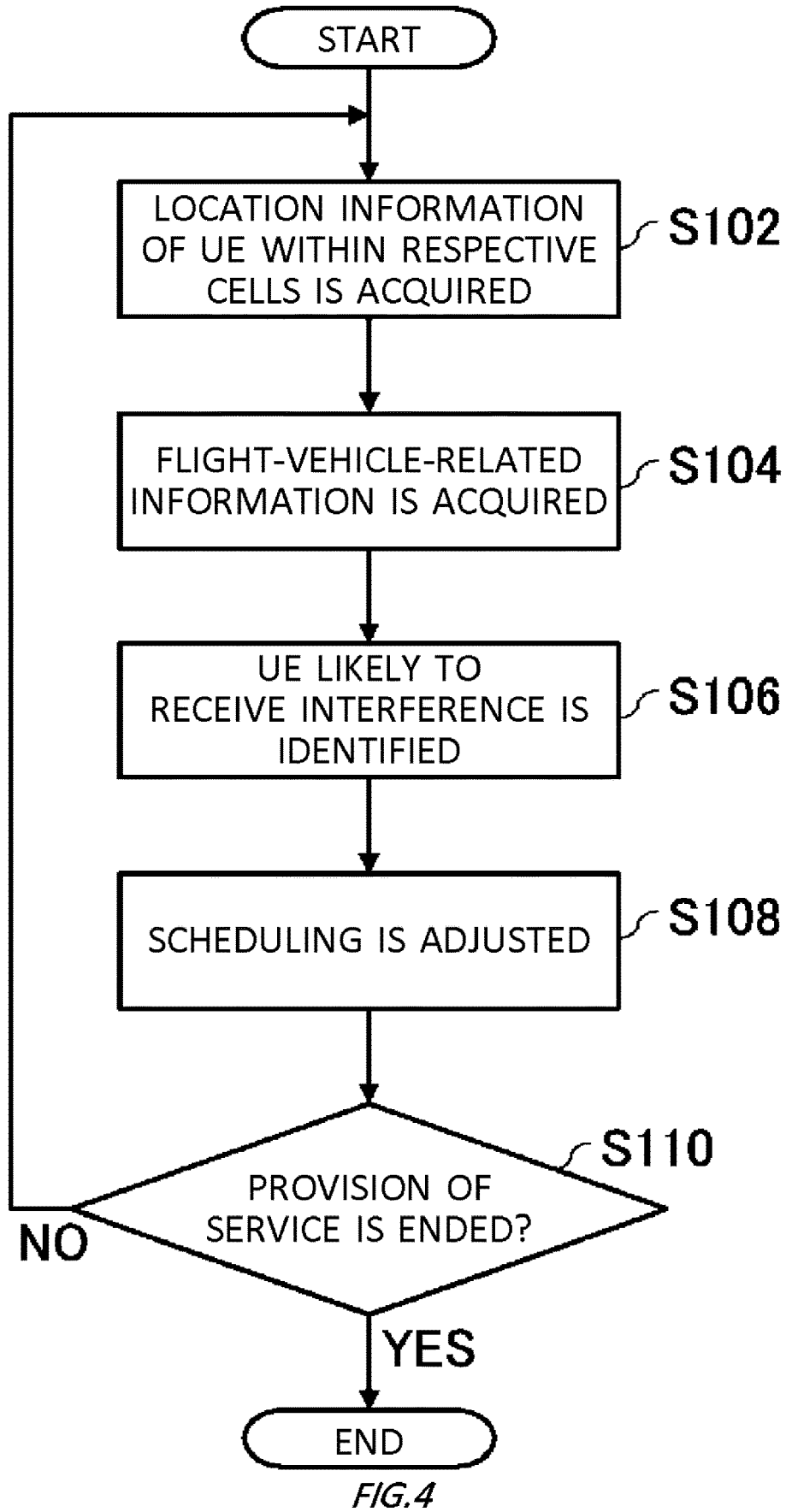
FIG. 4 schematically shows an example of a flow of a process by the base station apparatus 300.

FIG. 4 schematically shows an example of a flow of a process by the base station apparatus 300. Here, a description starts from a state in which a plurality of user terminals 400 are served by the multi-cell 110.

At step ("step" may be abbreviated as S) 102, location information of the user terminals 400 within the respective cells 120 is acquired. At S104, flight-vehicle-related information (a latitude and longitude, an altitude, a direction, an inclination, and the like) is acquired.

At S106, based on the location information and the flight-vehicle-related information acquired at S102 and S104, at least one likely to receive interference is identified of the plurality of user terminals 400 served by the multi-cell 110.

At S108, the scheduling of the wireless resources is controlled so as to prevent the interference with the at least one of the user terminals 400 identified at S106. For example, the base station apparatus 300 does not schedule wireless resources that are likely to cause interference with the identified at least one of the user terminals 400. Also, for example, the base station apparatus 300 schedules the wireless resources that are likely to interfere, for at least one of the user terminals 400 that has a weak correlation. Scheduling for preventing interference may be performed on both a frequency axis and a time axis.

At S110, it is determined whether to end the provision of the wireless communication service. If it is determined not to end, the process returns to S102, and if it is determined to end, the process ends.

Figure 5:
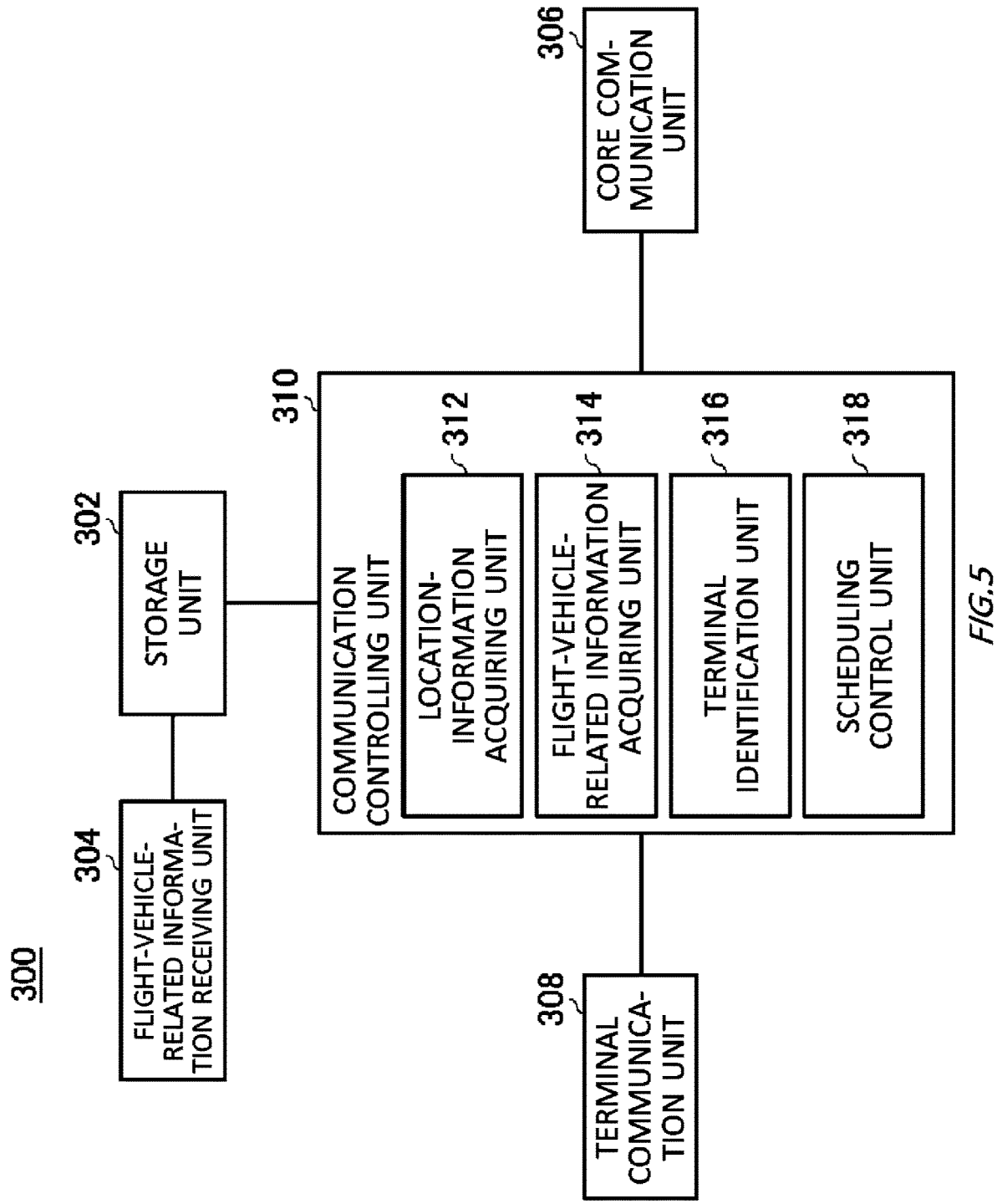
FIG. 5 schematically shows an example of a functional configuration of the base station apparatus 300.

FIG. 5 schematically shows an example of a functional configuration of the base station apparatus 300. The base station apparatus 300 includes a storage unit 302, a flight-vehicle-related information receiving unit 304, a core communication unit 306, a terminal communication unit 308, and a communication controlling unit 310.

The flight-vehicle-related information receiving unit 304 receives flight-vehicle-related information from the flight control apparatus. The flight-vehicle-related information receiving unit 304 receives, for example, location information of the HAPS 100. The flight-vehicle-related information receiving unit 304 receives, for example, attitude information of the HAPS 100. The flight-vehicle-related information receiving unit 304 receives, for example, information in pitch, roll, and yaw of the HAPS 100. In addition, the flight-vehicle-related information receiving unit 304 receives information of wind power output by the wind power sensor. The flight-vehicle-related information receiving unit 304 stores the received information in the storage unit 302.

The core communication unit 306 communicates with a core network. The core communication unit 306 may establish the feeder link 102 with the gateway 40 by the FL antenna for communication with the gateway 40 on the ground. The core communication unit 306 may communicate with a core network on the ground via the feeder link 102.

The terminal communication unit 308 communicates with the user terminals 400. The terminal communication unit 308 may form the multi-cell 110 by irradiating the beams 104 toward the ground using the SL antenna. The terminal communication unit 308 may establish the service links with the user terminals 400 within the multi-cell 110.

The communication controlling unit 310 controls the communication of the user terminals 400. The communication controlling unit 310 establishes a wireless communication connection with the user terminals 400 and so on, and allocates the wireless resources to the user terminals 400 to control the communication of the user terminals 400.

The communication controlling unit 310 includes a location-information acquiring unit 312, a flight-vehicle-related information acquiring unit 314, a terminal identification unit 316, and a scheduling control unit 318.

The location-information acquiring unit 312 acquires location information of the user terminals 400 served by the multi-cell 110. The location-information acquiring unit 312 may acquire location information of the user terminals 400 received from the user terminals 400 by the terminal communication unit 308. The user terminals 400 may measure their own location information by at least any of, for example, GPS positioning, base station positioning, or Wi-Fi (registered trademark) positioning.

The flight-vehicle-related information acquiring unit 314 acquires the flight-vehicle-related information. The flight-vehicle-related information acquiring unit 314 may acquire the flight-vehicle-related information stored in the storage unit 302.

Based on the location information of the plurality of user terminals 400 served by the multi-cell 110 and the flight-vehicle-related information, the terminal identification unit 316 identifies a victim user terminal, of the plurality of user terminals 400, that is expected to receive interference from at least one of the cells 120 other than one of the cells 120, serving. The terminal identification unit 316 identifies changes in a direction of travel of the HAPS 100 and an inclination of the HAPS 100, for example, based on the location on the flight path of the HAPS 100, and based on an identification result, estimates a change in a location of the multi-cell 110. Then, a victim user terminal, when the estimated change occurs, is identified that is expected to receive interference from at least one of the cells 120 other than one of the cells 120, serving.

The terminal identification unit 316 may predict a change in the attitude of the HAPS 100 based on a flight direction and the inclination of the HAPS 100 and the information of the wind power output by the wind power sensor. For example, when it is predicted that the HAPS 100 receives a strong wind from a front with its nose up, the terminal identification unit 316 predicts that the nose of the HAPS 100 will turn further upward. Then, based on a predicted result, the terminal identification unit 316 identifies a victim user terminal that is expected to receive interference from at least one of the cells 120 other than one of the cells 120, serving.

The scheduling control unit 318 controls scheduling of the wireless resources for the plurality of user terminals 400 served by the respective cells 120 of the multi-cell 110. In order to prevent interference expected to be received by the victim user terminal, which is identified by the terminal identification unit 316, the scheduling control unit 318 controls the scheduling of the wireless resources of one of the cells 120 that serves the victim user terminal (sometimes referred to as a serving cell) and at least one of the cells 120 that is expected to cause interference to the victim user terminal (sometimes referred to as an interfering cell). A serving cell may be an example of a first cell. An interfering cell may be an example of a second cell.

For example, the scheduling control unit 318 controls not to allocate a resource block in an interfering cell corresponding to a resource block allocated to a victim user terminal in a serving cell to any user terminals 400 served by the interfering cell. By way of a specific example, the scheduling control unit 318 controls not to allocate a resource block in an interfering cell having a same frequency band and a same time slot as a resource block allocated to a victim user terminal in a serving cell to any user terminals 400 served by the interfering cell. Thus, although the resource block in the interfering cell cannot be used for communication, the interference with the victim user terminal can be prevented.

For example, the scheduling control unit 318 controls to allocate a resource block in an interfering cell corresponding to a resource block allocated to a victim user terminal in a serving cell to at least one selected from a plurality of user terminals 400 served by the interfering cell, based on a distance to the victim user terminal. The scheduling control unit 318 may control to allocate a resource block in an interfering cell having a same frequency band and a same time slot as a resource block allocated to a victim user terminal in a serving cell to at least one selected from a plurality of user terminals 400 served by the interfering cell, based on a distance to the victim user terminal.

The scheduling control unit 318 may control to allocate a resource block in an interfering cell corresponding to a resource block allocated to a victim user terminal in a serving cell to at least one, of a plurality of user terminals 400 served by the interfering cell, that has a distance longer than a predetermined threshold to the victim user terminal. The scheduling control unit 318 may control to allocate a resource block in an interfering cell corresponding to a resource block allocated to a victim user terminal in a serving cell to at least one, of a plurality of user terminals 400 served by the interfering cell, that has a longer distance to the victim user terminal. Thus, because the resource block corresponding to the resource block allocated to the victim user terminal is allocated to the at least one of the user terminals 400 that has a weak correlation with the victim user terminal, the interference with the victim user terminal can be prevented and resource blocks can be used efficiently.

The scheduling control unit 318 may control such that a resource block allocated to a victim user terminal in a serving cell and a resource block allocated to a user terminal in an interfering cell, that has a distance shorter than a predetermined threshold to the victim user terminal, have at least either a different frequency band or a different time slot from each other. Thus, at least one of the user terminals 400 that has a strong correlation with the victim user terminal is caused to have at least either a different frequency band or a different time slot from the resource block allocated to the victim user terminal, and the interference can be prevented.

The scheduling control unit 318 may control such that a resource block allocated to a victim user terminal in a serving cell and a resource block allocated to a user terminal 400 in an interfering cell, that has a distance shorter than a predetermined threshold to the victim user terminal, have both a different frequency band and a different time slot from each other. Thus, at least one of the user terminals 400 that has a strong correlation with the victim user terminal is caused to have both a different frequency band and a different time slot from the resource block allocated to the victim user terminal, and the interference can be prevented.

Figure 6:
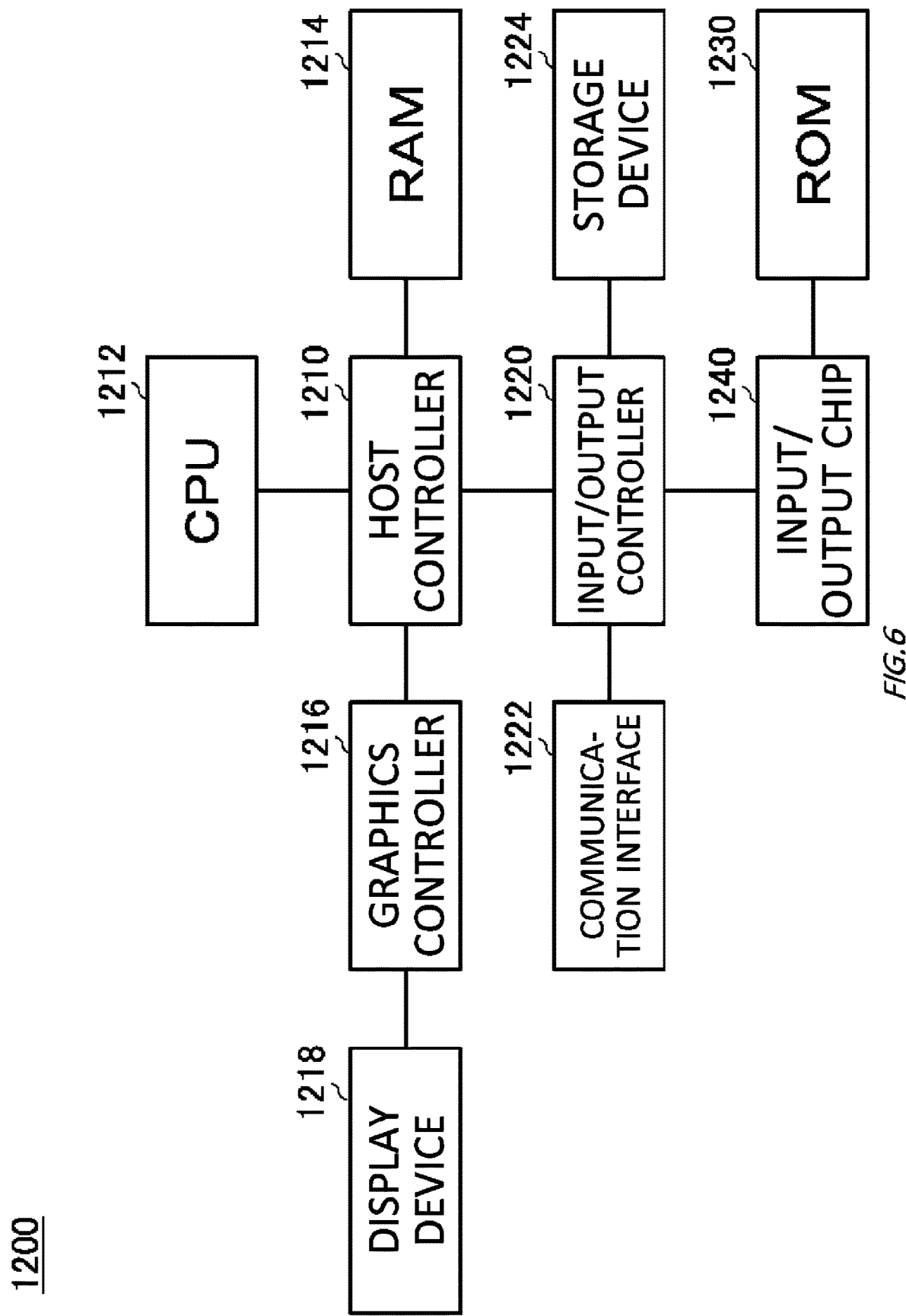
FIG. 6 schematically shows an example of a hardware configuration of computer 1200 functioning as the base station apparatus 300.

FIG. 6 schematically shows an example of a hardware configuration of computer 1200 functioning as the base station apparatus 300. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. In addition, the computer 1200 includes input/output units such as a communication interface 1222, a storage device 1224, and a DVD driver and an IC card drive, which are connected to the host controller 1210 through an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. An example of the computer-readable storage medium may include an electronic storage medium, a magnetic storage medium, an optical storage medium, an electromagnetic storage medium, or a semiconductor storage medium. More specific examples of computer-readable storage media may include a floppy disc (registered trademark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer-readable instruction to provide means for performing operations specified by the flowchart or the block diagram. An example of the processor includes a computer processor, a processing unit, a microprocessor, a digital signal processor, a controller, a microcontroller, or the like.

The above-described embodiment describes, but not limited to, the HAPS 100 as an example of a flight vehicle having an antenna forming a wireless communication area by irradiating beams toward the ground to provide a wireless communication service for a user terminal within the wireless communication area. Examples of the flight vehicle include a balloon, an airship, an airplane, and an unmanned aircraft, such as a drone, that are capable of forming a wireless communication area.

While the present invention has been described by way of the embodiments, the technical scope of the present invention is not limited to the above-described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMBERS

20: network, 40: gateway, 100: HAPS, 102: feeder link, 104: beam, 110: multi-cell, 120: cell, 122: cell, 124: cell, 130: main body, 140: wing portion, 150: solar cell panel, 200: flight control apparatus, 300: base station apparatus, 302: storage unit, 304: flight-vehicle-related information receiving unit, 306: core communication unit, 308: terminal communication unit, 310: communication controlling unit, 312: location-information acquiring unit, 314: flight-vehicle-related information acquiring unit, 316: terminal identification unit, 318: scheduling control unit, 400, 402, 404, 406, 408: user terminal, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip.

What is claimed is:

1. A base station apparatus mounted on a flight vehicle and forming a multi-cell comprising a plurality of cells on the ground to provide a wireless communication service for a user terminal within the multi-cell, the base station apparatus comprising:
    a location-information acquiring unit that acquires location information of a user terminal served by the multi-cell;
    a flight-vehicle-related information acquiring unit that acquires flight-vehicle-related information comprising location information and attitude information of the flight vehicle;
    a terminal identification unit that identifies, among a plurality of user terminals, each of which being the user terminal, a victim user terminal that is expected to receive interference from a cell other than a cell serving, based on the location information of the plurality of user terminals and the flight-vehicle-related information; and
    a scheduling control unit that controls, in order to prevent the interference, scheduling of wireless resources of a first cell, which is the cell serving the victim user terminal, and a second cell, which is the cell expected to cause interference to the victim user terminal, wherein the scheduling control unit controls the scheduling of the wireless resources of the first cell and the second cell using a scheduling control scheme selected from a group of scheduling control schemes consisting of:
    (a) control so as not to allocate a resource block in the second cell corresponding to a resource block allocated to the victim user terminal in the first cell to any user terminals served by the second cell,
    (b) control so as to allocate a resource block in the second cell corresponding to a resource block allocated to the victim user terminal in the first cell to at least one selected from a plurality of user terminals served by the second cell, based on a distance to the victim user terminal, and
    (c) control such that a resource block allocated to the victim user terminal in the first cell and a resource block allocated to a user terminal in the second cell, that has a distance shorter than a predetermined threshold to the victim user terminal, have at least either a different frequency band or a different time slot from each other.

2. The base station apparatus according to claim 1, wherein the scheduling control scheme (a) comprises controlling so as not to allocate a resource block in the second cell having a same frequency band and a same time slot as a resource block allocated to the victim user terminal in the first cell to any user terminals served by the second cell.

3. The base station apparatus according to claim 1, wherein the scheduling control scheme (b) comprises controlling so as to allocate a resource block in the second cell having a same frequency band and a same time slot as a resource block allocated to the victim user terminal in the first cell to at least one selected from a plurality of user terminals served by the second cell, based on a distance to the victim user terminal.

4. The base station apparatus according to claim 1, wherein the scheduling control scheme (b) comprises controlling so as to allocate a resource block in the second cell corresponding to a resource block allocated to the victim user terminal in the first cell to at least one, of a plurality of user terminals served by the second cell, that has a distance longer than a predetermined threshold to the victim user terminal.

5. The base station apparatus according to claim 3, wherein the scheduling control scheme (b) further comprises controlling so as to allocate a resource block in the second cell corresponding to a resource block allocated to the victim user terminal in the first cell to at least one, of a plurality of user terminals served by the second cell, that has a distance longer than a predetermined threshold to the victim user terminal.

6. The base station apparatus according to claim 1, wherein the scheduling control scheme (b) comprises controlling so as to allocate a resource block in the second cell corresponding to a resource block allocated to the victim user terminal in the first cell to at least one, of a plurality of user terminals served by the second cell, that has a longer distance to the victim user terminal.

7. The base station apparatus according to claim 3, wherein the scheduling control unit scheme (b) further comprises controlling so as to allocate a resource block in the second cell corresponding to a resource block allocated to the victim user terminal in the first cell to at least one, of a plurality of user terminals served by the second cell, that has a longer distance to the victim user terminal.

8. The base station apparatus according to claim 1, wherein the scheduling control scheme (c) comprises controlling such that a resource block allocated to the victim user terminal in the first cell and a resource block allocated to a user terminal in the second cell, that has a distance shorter than a predetermined threshold to the victim user terminal, have both a different frequency band and a different time slot from each other.

9. A non-transitory computer-readable storage medium storing a program causing a computer to function as a base station apparatus mounted on a flight vehicle and forming a multi-cell comprising a plurality of cells on the ground to provide a wireless communication service for a user terminal within the multi-cell, the base station apparatus comprising:
- a location-information acquiring unit that acquires location information of a user terminal served by the multi-cell;
- a flight-vehicle-related information acquiring unit that acquires flight-vehicle-related information comprising location information and attitude information of the flight vehicle;
- a terminal identification unit that identifies, among a plurality of user terminals, each of which being the user terminal, a victim user terminal that is expected to receive interference from a cell other than a cell serving, based on the location information of the plurality of user terminals and the flight-vehicle-related information; and
- a scheduling control unit that controls, in order to prevent the interference, scheduling of wireless resources of a first cell, which is the cell serving the victim user terminal, and a second cell, which is the cell expected to cause interference to the victim user terminal, wherein the scheduling control unit controls the scheduling of the wireless resources of the first cell and the second cell using a scheduling control scheme selected from a group of scheduling control schemes consisting of:
  - (a) control so as not to allocate a resource block in the second cell corresponding to a resource block allocated to the victim user terminal in the first cell to any user terminals served by the second cell,
  - (b) control so as to allocate a resource block in the second cell corresponding to a resource block allocated to the victim user terminal in the first cell to at least one selected from a plurality of user terminals served by the second cell, based on a distance to the victim user terminal, and
  - (c) control such that a resource block allocated to the victim user terminal in the first cell and a resource block allocated to a user terminal in the second cell, that has a distance shorter than a predetermined threshold to the victim user terminal, have at least either a different frequency band or a different time slot from each other.

10. A system comprising:
the base station apparatus according to claim 1; and
the flight vehicle.

11. A system comprising:
the base station apparatus according to claim 2; and
the flight vehicle.

12. A system comprising:
the base station apparatus according to claim 3; and
the flight vehicle.

13. A system comprising:
the base station apparatus according to claim 4; and
the flight vehicle.

14. A system comprising:
the base station apparatus according to claim 6; and
the flight vehicle.

15. A control method executed by a base station apparatus mounted on a flight vehicle and forming a multi-cell comprising a plurality of cells on the ground to provide a wireless communication service for a user terminal within the multi-cell, the control method comprising:
- acquiring location information of a user terminal served by the multi-cell;
- acquiring flight-vehicle-related information comprising location information and attitude information of the flight vehicle;
- identifying, among a plurality of user terminals, each of which being the user terminal, a victim user terminal that is expected to receive interference from a cell other than a cell serving, based on the location information of the plurality of user terminals and the flight-vehicle-related information; and
- controlling, in order to prevent the interference, scheduling of wireless resources of a first cell, which is the cell serving the victim user terminal, and a second cell, which is the cell expected to cause interference to the victim user terminal, using a scheduling control scheme selected from a group of scheduling control schemes consisting of:
  - (a) control so as not to allocate a resource block in the second cell corresponding to a resource block allocated to the victim user terminal in the first cell to any user terminals served by the second cell, (b) control so as to allocate a resource block in the second cell corresponding to a resource block allocated to the victim user terminal in the first cell to at least one selected from a plurality of user terminals served by the second cell, based on a distance to the victim user terminal, and (c) control such that a resource block allocated to the victim user terminal in the first cell and a resource block allocated to a user terminal in the second cell, that has a distance shorter than a predetermined threshold to the victim user terminal, have at least either a different frequency band or a different time slot from each other.

* * * * *